Feb. 2, 1943.  E. A. DAVIS  2,309,755
APPARATUS FOR HANDLING STRIP MATERIAL
Filed Aug. 3, 1940  3 Sheets-Sheet 1
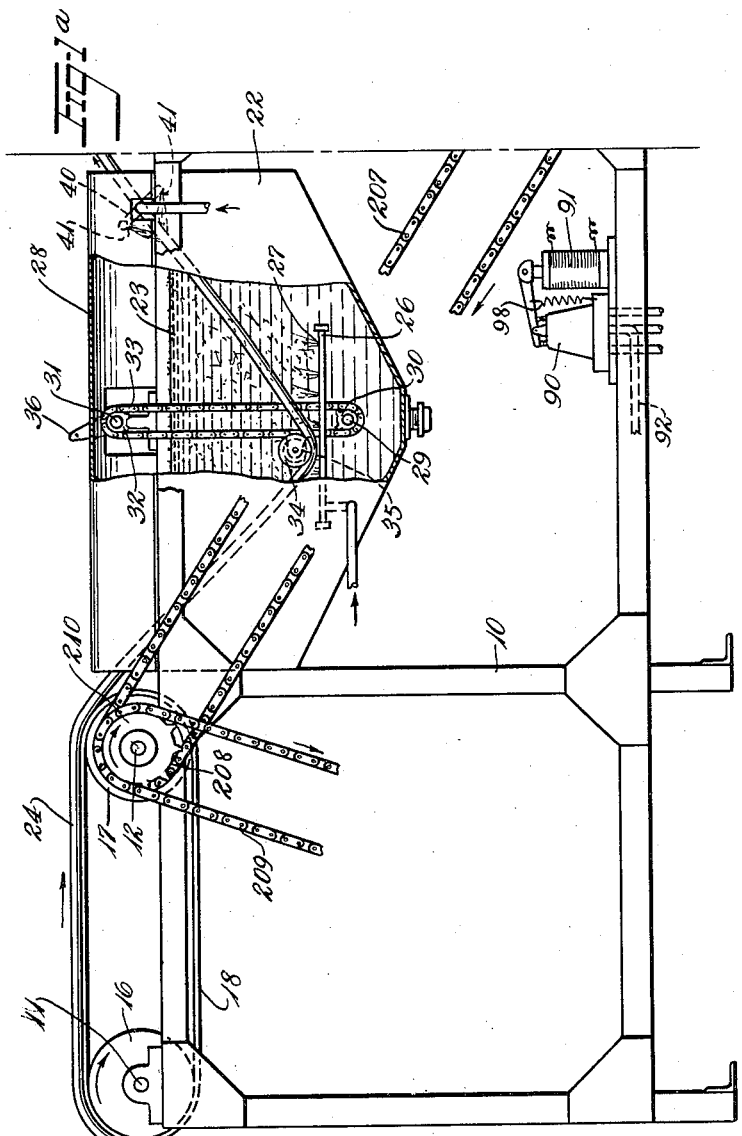
Inventor
Edward A. Davis
By Willis J. Avery
Atty.

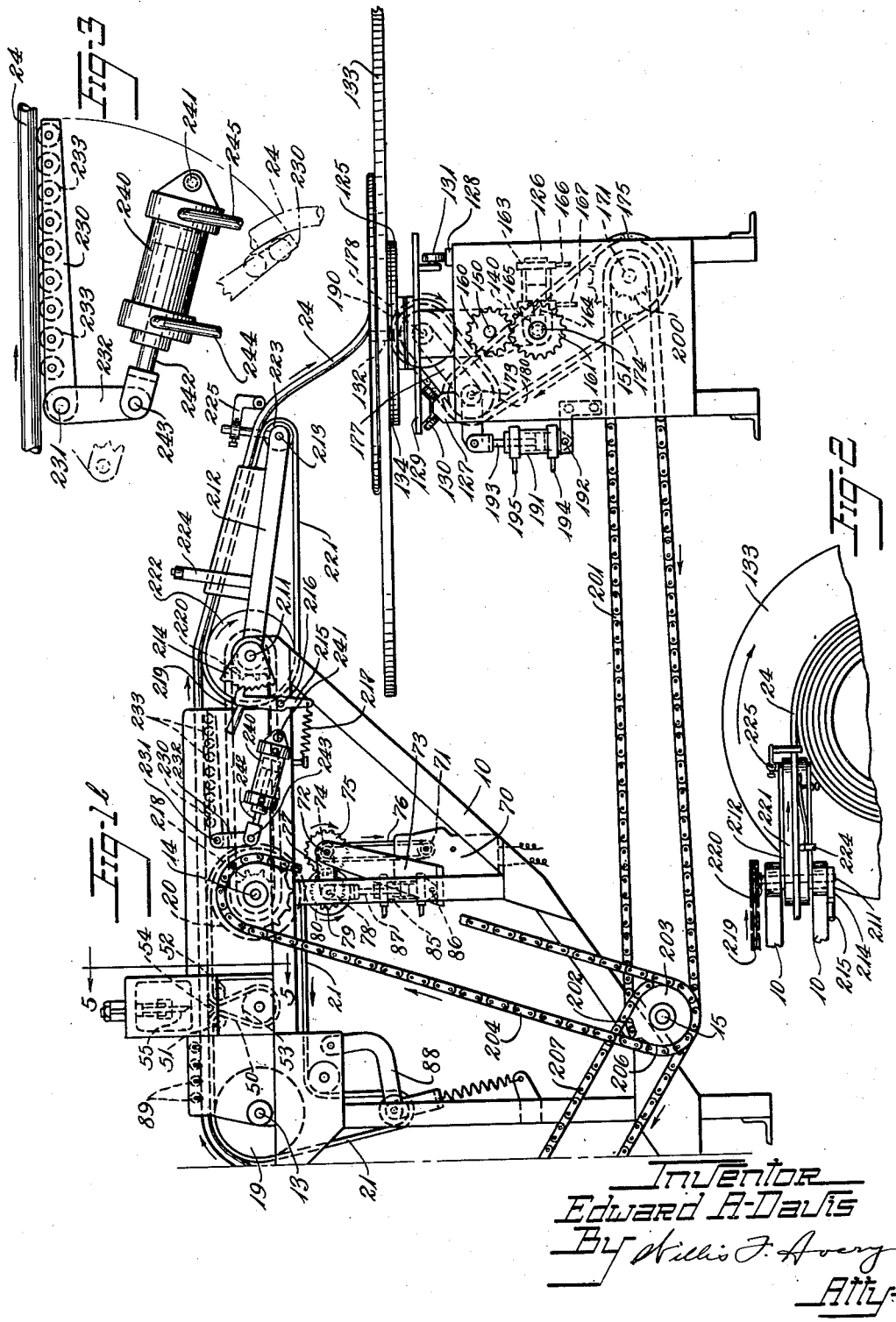

Feb. 2, 1943.  E. A. DAVIS  2,309,755
APPARATUS FOR HANDLING STRIP MATERIAL
Filed Aug. 3, 1940  3 Sheets-Sheet 3
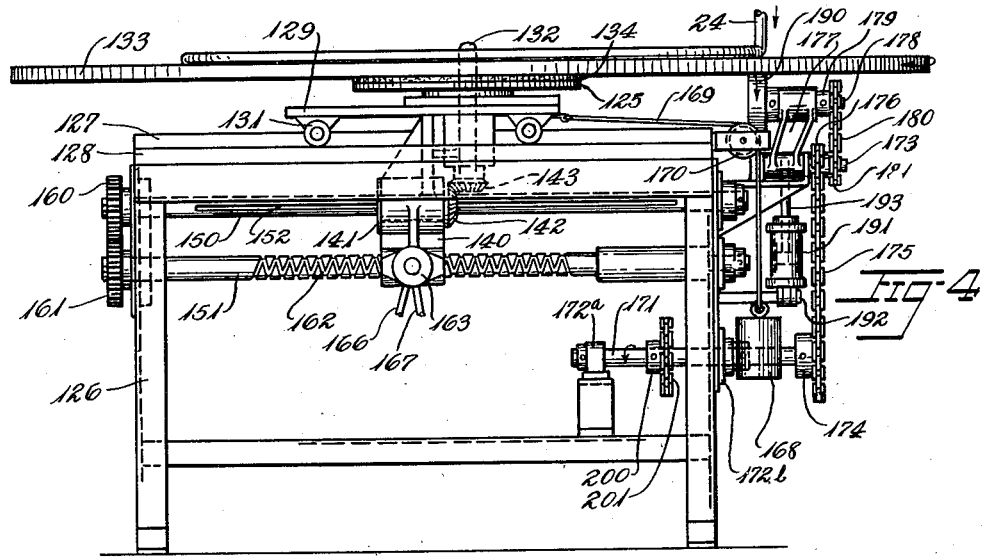
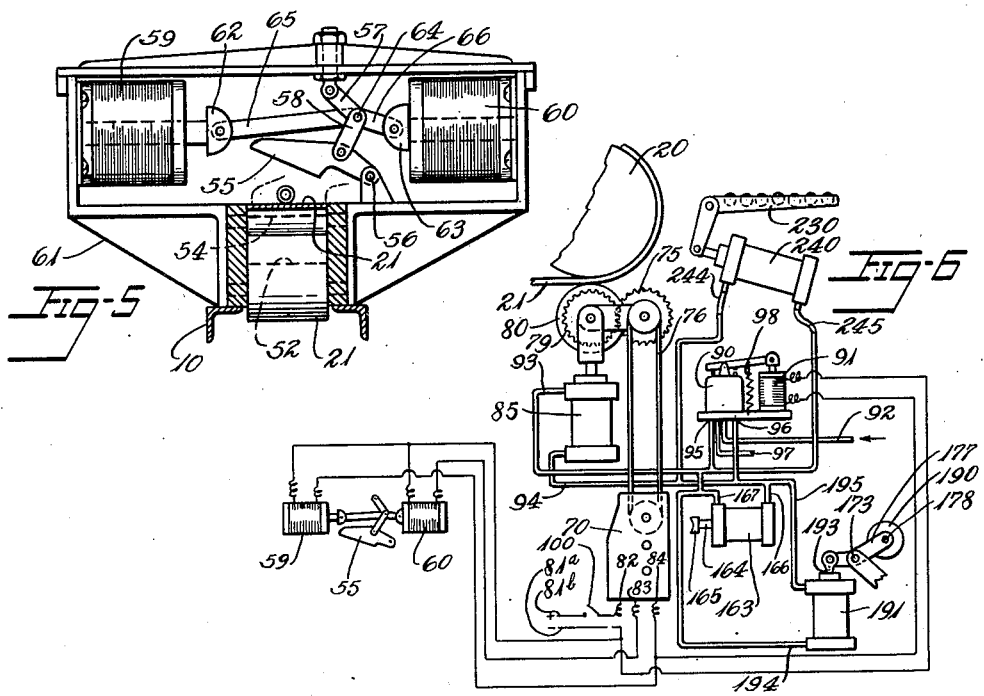
Inventor
Edward A. Davis
By Willis F. Avery
Atty.

Patented Feb. 2, 1943

2,309,755

UNITED STATES PATENT OFFICE 2,309,755

APPARATUS FOR HANDLING STRIP MATERIAL

Edward A. Davis, Akron, Ohio, assignor to The B. F. Goodrich Company, New York, N. Y., a corporation of New York Application August 3, 1940, Serial No. 350,551

12 Claims. (Cl. 18—1)

This invention relates to apparatus for handling strip material and is especially useful where flexible strip of hot extensible material, such as an extruded rubber strip is to be fed from a supply, cut to length, and coiled.

In the manufacture of hose, rubber tubing, and other extruded strip material it is desirable to feed the material to cutting means where it is cut to length and to coil it in flat coils for vulcanizing purposes.

As the material is hot and very soft and extensible and issues from the extruding machine at a varying speed depending upon feed of the machine, temperature of the stock, and other variables, coiling or other handling of the strip without stretching it out of gauge is very difficult. As the material shrinks considerably after release of extruding pressure measuring of the strip and cutting of it to length present many difficulties.

The present invention aims to provide for overcoming these difficulties by synchronous control of measuring, cutting and coiling means and by speed regulated control of the operations to correspond with the speed of forming.

The principal objects of the invention are to provide automatic control of the feeding, cutting, and coiling operations, to provide for cutting the material accurately to length, to provide for regulating coiling speed to the delivery speed, and to provide automatic resetting of the coiling mechanism.

These and other objects will appear from the following description and the accompanying drawings.

Of the drawings:

Fig. 1a is a side elevation of the receiving end of the apparatus, parts being broken away.

Fig. 1b is a continuation thereof showing the cutting and delivery end of the apparatus, parts being broken away.

Fig. 2 is a partial plan view of the turntable and the delivery mechanism, other parts being broken away.

Fig. 3 is a detail side view of the scrap conveyor, other parts being broken away.

Fig. 4 is an end view of the coiling mechanism.

Fig. 5 is a section taken along the line 5—5 of Fig. 1b.

Fig. 6 is a diagram showing the piping and wiring of the control elements.

Referring to the drawings, the numeral 10 designates a frame on which a plurality of horizontal shafts 11, 12, 13, 14, and 15 are rotatably mounted in parallel relation. Shafts 11 and 12 have pulleys 16 and 17 fixed thereto for supporting and driving a conveyor belt 18 trained thereabout. Similarly shafts 13 and 14 have pulleys 19 and 20 fixed respectively thereto for supporting and driving a conveyor belt 21 trained thereabout. Belts 18 and 21 are spaced apart and separated by a tank 22, containing a coating solution 23, such as a suspension of talc powder in water, adapted to coat a strip 24 of extruded material, such as rubber tubing, traveling over the two conveyors from an extruding machine 25. The tubing 24 is cooled by the water of the suspension and is coated by the suspended material so as to prevent its sticking together when coiled. A jet pipe 26 submerged in the water is supplied with compressed air from any convenient source (not shown) to agitate the liquid and keep it in suspension and to cool the liquid. It is provided with upwardly directed jet openings 27. To provide against spray of the liquid from the tank, a cover 28 is provided.

To facilitate threading of the strip through the liquid a shaft 29 is submerged in the liquid and has a sprocket 30 fixed thereto. A shaft 31 is rotatably mounted above the liquid and parallel to shaft 29. A sprocket 32 is fixed to shaft 29 and a chain 33 is trained about sprockets 30 and 32. A guide pulley 34 is rotatably mounted on a bracket 35 fixed to chain 33. A crank 36 is fixed to shaft 31. The arrangement is such that guide pulley 34 may be raised or submerged by manipulation of crank 36 and in the raised position, the strip 24 may be readily threaded thereunder so that in the lowered position the strip will be submerged.

For drying the liquid from the strips, a pipe 40, formed in a loop for the strip to pass through, has jets 41 directed inwardly against the strip, and is supplied with air under pressure from a source, not shown, to dry the strip.

For automatically cutting the strip to a desired length during its travel, the upper reach of the conveyor belt 21 is formed in a loop 50 guided by rollers 51, 52, 53, and an anvil 54 is located over the loop and level with the straight portion of the reach. A guillotine cutter 55 is mounted on a pivot 56 over the anvil and is adapted to be forced toward the anvil by toggle links 57, 58. A pair of solenoids 59, 60 are mounted on the stationary frame 61, which supports the anvil and toggle bearings, in positions facing each other, and their armatures 62, 63 are connected to the toggle links at their pivot 64 by links 65, 66. The arrangement is such that if either solenoid is energized the toggle links will be aligned so as to force the knife 55 through the strip against the anvil and will then be elbowed in the other direction lifting the knife. By alternate energizing of the solenoids, successive cuts may be made.

A control counter 70, which may be of the type known as the "Portland Anyset count controller" is mounted on the frame 10 of the machine, this counter having the functions of tabulating the linear amount of strip material passing a certain station by rolling contact, and of closing control circuits at the start and at the finish of travel of a desired length. The device can be set for any desired length and does not require resetting at each measuring operation. A pulley 71 is fixed to the shaft thereof. A shaft 72 is rotatably mounted in a bracket 73 fixed to the frame, and has a pulley 74 and a gear 75 fixed thereto. A belt 76 drives pulley 71 from pulley 74. A swinging bracket 77 is pivoted on shaft 72. A shaft 78 is rotatably mounted at the outer end of the bracket and has a gear 79 and a pulley 80 fixed thereto. Gear 75 meshes with gear 79 which drives it, and pulley 80 is adapted to be driven by contact with conveyor belt 21. A double-acting pressure cylinder 85 is pivotally secured, as at 86 to frame 10 and its piston rod 87 is pivotally connected to shaft 78. The arrangement is such that when the piston rod 87 is raised pulley 80 is held against belt 21 and the counter 70 is actuated, and when piston rod 87 is lowered the counter stops recording. The counter is geared to record the number of feet of the strip passing over the belt while the pulley 80 is in contact with the conveyor belt. A spring tightener 88 keeps the conveyor belt free from slack, and a set of weighted rollers 89 rests upon the strip 24 to prevent its slipping with relation to the conveyor belt. Referring to Fig. 6, the counter 70 has a three-way switch incorporated therein and may be set to close and open circuits. The switch is energized from main power wires 81a, 81b and has three terminals 82, 83, 84. Terminal 82 is connected directly to power wire 81b. Solenoid 60 is connected across terminal 83 and line 81a. Solenoid 61 is connected across terminal 84 and line 81a. When the switch connects terminal 83 to terminal 82 solenoid 60 is energized and solenoid 59 is de-energized. When the switch connects terminal 82 to terminal 84, solenoid 59 is energized and solenoid 60 is de-energized. The arrangement is such that closing of the switch in either direction lowers and immediately raises knife 55.

Cylinder 85 is operated by a four-way "Ross valve" 90 actuated by a solenoid 91. The "Ross valve" is a solenoid operated valve arrangement whereby a set of valves of the poppet type function under energizing of the solenoid to control fluid pressure through a series of control pipes. The valve is supplied with compressed air or other operating fluid from a line 92. Pipes 93, 94 connect the upper and lower ends of cylinder 85 respectively to outlet supply ports 95, 96 of the valve 90. The valve also has an exhaust port 97. The valve is normally held in position to supply air to pipe 93 and open pipe 94 to the exhaust and thereby holding roller 80 out of contact with belt 21. This is due to a spring 98 which acts against the force of solenoid 91. When solenoid 91 is energized it overcomes the spring and throws the valve to a position where pipe 94 is connected to the air supply and pipe 93 to the exhaust raising the roller 80 into contact with belt 21. Solenoid 91 is wired across power line 81a and terminal 84 of the control counter so that it is energized only when solenoid 59 is energized. A starting switch 100 of the push button control type is provided in the power line for convenient manipulation by an operator. The arrangement is such that when the switch 100 is closed the solenoid 59 is energized, actuating the knife 55 to sever the strip 24 and simultaneously solenoid 91 is energized raising roller 80 against belt 21 and starting the control counter. When the desired length of strip has passed the knife 55, the control counter de-energizes solenoids 91 and 59 and energizes solenoid 60 causing the knife 55 to again sever the strip and simultaneously dropping roller 80 from contact with belt 21. When switch 100 is again closed, the cutting and measuring operation will be repeated.

Means are provided for coiling the cut strip of material in a "pancake" coil while it is being measured and cut to length so that it is in convenient form for further treatment. For this purpose, a turntable 125 is provided and is adapted to be driven at such variable speed as to wind the strip at a uniform linear velocity corresponding to that of the conveyor belt 21, and means are also provided to deliver the strip tangentially to the coil being formed.

For supporting and driving the turntable a frame 126 is provided with rails 127, 128 extending crosswise of the conveyor 21. A carriage 129 is provided with rollers 130, 131 engaging the rails. A vertical spindle 132 is rotatably mounted in the carriage and has the turntable 125 fixed thereto, its upper end extending through the turntable to act as a dowel. A circular disc tray 133 is adapted to fit over the spindle and to be removably supported by the turntable 125 which has a friction surface 134 for engaging the bottom of the tray.

Suspended from the carriage 129 is a bracket 140 which provides a vertical bearing for the spindle 132 and also a horizontal bearing for a quill 141. The quill 141 has a miter gear 142 fixed thereto and a similar miter gear 143 is fixed to spindle 132 and meshes with gear 142.

A pair of parallel horizontal shafts 150, 151 are journaled in the frame 126. Shaft 150 has a feather key 152 and extends through quill 141 which has a key-way fitting said feather key, the arrangement being such that carriage 129 may be moved along its rails from end to end of the frame 126 and at all positions of the carriage rotation of the turntable causes rotation of shaft 150. A spur gear 160 is fixed to shaft 150 and meshes with a spur gear 161 fixed to shaft 151. Shaft 151 is formed with a cam groove 162 comprising intersecting helical grooves of opposite hand joined to each other at their ends to provide a continuous groove. An air cylinder 163 is mounted on bracket 140 and its piston rod 164 is formed with a follower 165 adapted to engage the groove. When air is admitted to cylinder 163 through a pipe 166, the follower engages the cam groove and rotation of the shaft caused by rotation of the turntable imparts a traverse motion to the turntable. When air under pressure is admitted through a pipe 167 to the front of the cylinder, the follower 165 is disconnected from the cam groove.

A weight 168 is suspended from a cord 169 attached to carriage 129 and passing about a pulley 170 on the frame. When the follower 165 is released from the cam 162, the carriage 129 is moved to the right in Fig. 4 by pull of the weight 168 and comes to rest with its spindle 132 substantially in alignment with the strip 24. When the follower engages the cam shaft, the carriage is moved first to the right and then to the left to coil the material in continuing overlying spirals. Pipe 166 is connected to pipe 94 and pipe 167 is connected to pipe 93 so that when the roller 80 engages the belt 21 to measure the strip, the follower engages the cam groove to move the turntable back and forth in its coiling movement and when the roller 80 leaves the belt 21, the table is moved by the weight 168 to starting position.

The turntable 125 is driven as follows: A horizontal shaft 171 is rotatably mounted in bearings 172a, 172b on the frame 126 and a second shaft 173 is mounted on the frame 126 parallel thereto. A sprocket 174 fixed to shaft 171 drives a chain 175 which drives a sprocket 176 rotatably supported on shaft 173. A lever arm 177 is pivoted on shaft 173 and has a bearing at one end thereof in which a shaft 178 is rotatably mounted. A sprocket 179 is fixed to the shaft 178 and is driven by a chain 180 from a sprocket 181 fixed to sprocket 176. A roller 190 is also fixed to shaft 178 and is adapted to engage the under side of disc 133 to drive the same. The arrangement is such that the roller contacts with the disc directly below the point of delivery of the strip 24 and drives that portion with which it contacts at a uniform linear speed.

A cylinder 191 is pivotally mounted, as at 192 to the frame 126 and its piston rod 193 is pivotally connected to lever arm 177. A pressure supply pipe 194 connects the lower end of the cylinder to pipe 167 and a pipe 195 connects its upper end to the pipe 166. The arrangement is such that when the follower 165 is engaged in the cam groove 162, the roller 190 engages the disc 133 to rotate the same, and when the follower 165 is disengaged, the roller 190 simultaneously disengages the disc 133.

To provide for driving the turntable and the conveyor belts in unison, shaft 171 has a sprocket 200 fixed thereto which is driven by a chain 201 from a sprocket 202 fixed to shaft 15. Another sprocket 203 fixed to shaft 15 drives a chain 204 which drives a sprocket 205 fixed to shaft 14 which drives conveyor belt 21. Another sprocket 206 fixed to shaft 15 is driven by a chain 207 from a sprocket 208 fixed to shaft 12 which drives conveyor 18. Shaft 12 is driven from any convenient source of power (not shown) by a chain 209 which engages a sprocket 210 fixed to shaft 12.

Where it is desired to drive the mechanism at a variable speed from a variable speed drive controlled by a valve 25a contacting with a loop of the strip 24 as the strip comes from an extruding head 25 or other forming means, the chain 209 may be driven by speed control apparatus such as that disclosed in my application Ser. No. 305,569, filed November 21, 1939, and entitled "Speed regulating apparatus."

For guiding the strip 24 to the turntable, a shaft 211 is rotatably mounted at the end of frame 10 parallel to shaft 14 and spaced therefrom. A swing frame 212 is pivotally mounted on the shaft and supports a shaft 213 rotatably mounted at its swinging end and parallel to shaft 211. A rack sector 214 is fixed to swing frame 212 and a locking pawl 215 is pivotally mounted on frame 10, as at 216, in a position to engage the notches in the sector to lock the swing frame in different positions. A coil spring 217 mounted between the frame 10 and the pawl holds the pawl in locked position.

Shaft 211 is driven from shaft 14 by a sprocket 218, fixed to shaft 14, a chain 219, and a sprocket 220, fixed to shaft 211. A conveyor belt 221 is driven by a pulley 222 fixed to shaft 211 and is supported by a pulley 223 fixed to shaft 213. Guides 224 and 225 are provided to guide the strip 24 over the belt 221 which may be adjusted to deliver the strip 24 close to the disc 133.

To support the strip 24 between the conveyor belts 21 and 221 without stretching it and to provide for deflecting scrap material from passing to belt 221, a swing frame 230 is provided between belts 21 and 221 and is pivoted at one end on a bar 231. The bar is rotatably mounted in frame 10 and has a lever arm 232 fixed thereto by which it may be swung from a position in alignment with the upper reaches of belts 21 and 221 to a position downwardly inclined therefrom. Anti-friction rollers 233 are rotatably mounted on the swing frame to support the strip 24 in its passage from belt 21 to belt 221 without stretching. For operating the swing frame, a fluid-pressure cylinder 240 is pivotally mounted, as at 241 on frame 10 and its piston rod 242 is pivotally connected, as at 243, to lever arm 232. For operating the cylinder to swing the frame 230, a pipe 244 from its outer end is connected to pipe 96 from valve 90 and a pipe 245 from its other end is connected to pipe 95 of valve 90. The arrangement is such that simultaneous with the starting of rotation of the disc 133 and the cutting of the leading end of strip 24 and the starting of the measuring operation, the frame 230 is lifted to its upper position to guide the strip 24 to the coiling mechanism, and simultaneous with cutting of the trailing end of the strip at the end of the measuring operation, the frame 230 is moved to the dot-and-dash position of Fig. 3 so that unmeasured scrap strip is delivered to a scrap box below the frame 230 until a new measuring operation is started.

The operation of the apparatus is as follows: Strip material such as unvulcanized rubber of hot stretchable and soft nature may be supplied from an extruding machine 25. Material so made or other strip material may be fed to belt 18 and thereover to the cooling and coating tank 22 which tends to harden the hot soft material. Excess coating material is blown from the strip and the strip dried by the jets 41 and the strip passes on to the measuring belt 21. As the leading end of the strip passes under the knife 55, the operator closes the switch 100 causing the knife 55 to descend and sever the strip. Simultaneously with the cutting operation, the measuring roller 80 is pressed against the measuring conveyor, the swing frame 23 is raised, the follower 165 engages the screw threads 162, and the roller 190 is raised to engage the disc 133. The scrap end cut from the leading end of the strip passes over the swing frame 230 while it is being raised so that it is delivered to the scrap box. There is sufficient clearance at the end of the swing frame to permit the scrap end to pass it even after the swing frame is raised, and the weight of the scrap hanging beyond the swing frame acts to pull the scrap clear. The leading end of the new strip is fed onto the turntable which is at a position to receive its leading end near its center. As the material is delivered, the turntable is moved laterally the width of the strip at each revolution of the table and when one layer of coiled material is laid the second layer is laid thereon with the table moving laterally in the opposite direction. When the desired amount of the strip has passed the measuring mechanism, the knife operates to sever it from the oncoming material. Inertia of the turntable coils the trailing end although contact of roller 190 with the turntable disc is released with the cut. The release of the cam screw follower 165 is also simultaneous with the cutting so that no matter what position the table is at, depending upon the desired length of strip, the table is returned by weight 168 to its initial winding position. Dropping of the swing frame 230 is also simultaneous with cutting so that until set for another cut the oncoming material runs down the inclined frame into the scrap box.

Accurate control of speed of the conveyors and turntable with relation to feed of the strip from the extruding head is accomplished by the variable speed control mechanism operated from the valve 25a so that no stretching of the strip occurs making accurate measuring, cutting, and reeling possible.

The coiling mechanism starts coiling operations nearest its center. Regardless of stopping position for rotation of the turntable, the follower reengages the cam screw at the end of its groove each time it starts, preventing confinement of coiling to a restricted zone of the disc.

Variations may be made without departing from the scope of the invention as it is defined by the following claims.

I claim:

1. Apparatus for handling stretchable strip material in which forming means delivers a plastic strip at a variable speed, said apparatus comprising means for receiving the strip from the forming means delivering the strip at a variable speed and for delivering it without stretch of the material, measuring means, means controlled by said measuring means for cutting the strip accurately to length, and turn-table means controlled by said measuring means and timed to said delivering means for reeling the cut material.

2. Apparatus for handling stretchable strip material in which forming means delivers a plastic strip at a variable speed, said apparatus comprising measuring means, means for receiving the strip from the forming apparatus operating at a variable speed and for delivering it without stretch to said measuring means, means controlled by said measuring means for cutting the strip accurately to length, and turn-table means synchronized with said measuring means and controlled in velocity by said delivering means for coiling the cut material in a flat coil.

3. Apparatus for handling strip material, said apparatus comprising measuring means operable on a moving strip, means controlled by said measuring means for cutting the strip accurately to length, and turn-table means controlled by said measuring means for coiling the cut material in a flat coil substantially without stretch.

4. Apparatus for handling strip material, said apparatus comprising measuring means operable from a running strip, cutting means in the path of said strip, hand-operated means for cutting the leading end from said strip and for simultaneously starting said measuring means, and means controlled by said measuring means for cutting the trailing end from the strip when a measured length has passed said measuring means.

5. Apparatus for handling strip material, said apparatus comprising measuring means operable from a running strip, cutting means in the path of said strip, conveyor means for delivering the cut strip to reeling mechanism, and means controlled by said measuring means for deflecting said conveyor means to discard scrap lengths of the strip.

6. Apparatus for handling strip material, said apparatus comprising a plurality of aligned conveyors, measuring means operable from a running strip on one of the conveyors, and means automatically controlled by said measuring means for deflecting a succeeding conveyor to discard scrap material.

7. Apparatus for handling strip material, said apparatus comprising a plurality of aligned conveyors, measuring means operable from a running strip on one of said conveyors, turn-table means beyond said conveyors and controlled by said measuring means for coiling material from said conveyors, cutting means along one of said conveyors and controlled by said measuring means for cutting lengths of the strip to be coiled, and means controlled by said measuring means to discard scrap material between the lengths to be coiled.

8. Apparatus for handling strip material, said apparatus comprising a winding table, conveyor means for depositing strips thereon, means for driving the table to deposit the strips at a uniform linear velocity, means for imparting a transverse motion to said table to coil the strips, and means other than the transverse motion means for automatically releasing the transverse-motion means from said table and returning said table to a determinate starting position at the start of each winding operation.

9. Apparatus for handling strip material, said apparatus comprising a winding table, conveyor means for depositing strips thereon, means for driving the table at a uniform linear velocity at the position of deposit, means associated with said conveyor means for cutting the strip material to lengths, and means for automatically disconnecting said driving means from the table as each strip is cut to length.

10. Apparatus for handling strip material, said apparatus comprising a winding table, means for delivering strip material thereto, a friction roller adapted to drive said table at a variable angular velocity to correspond with the linear velocity of strip material to be coiled thereon, and measuring means contacting said strip for automatically disconnecting the table from contact with said friction roller at the end of a winding operation.

11. Apparatus for handling strip material, said apparatus comprising coiling means, friction means for driving said coiling means, means for feeding strips of material to said coiling means, and measuring means controlled by said feeding means for disconnecting said driving means at the end of a coiling operation.

12. Apparatus for handling strip material, said apparatus comprising means for continuously forming a strip of stretchable soft material, conveyor means for delivering the strip from said forming means, means for driving said conveyor means at a speed controlled by the speed of delivery from said forming means, measuring means associated with said conveyor means, cutting means in the path of the strip controlled by said measuring means for cutting the strip to desired lengths, coiling means driven from said conveyor means for coiling the strips in spiral coils, and means controlled by said measuring means for interrupting the coiling means and discarding scrap material between successive coiling operations.

EDWARD A. DAVIS.